March 5, 1935.  H. D. CHURCH  1,993,359

LUBRICATING SYSTEM

Filed Nov. 18, 1929

INVENTOR
Harold D. Church
BY Harvey R. Hawgood
ATTORNEY

Patented Mar. 5, 1935

1,993,359

UNITED STATES PATENT OFFICE 1,993,359

LUBRICATING SYSTEM

Harold D. Church, Cleveland, Ohio, assignor to The White Motor Company, Cleveland, Ohio, a corporation of Ohio Application November 18, 1929, Serial No. 407,880

6 Claims. (Cl. 184—6)

This invention relates to lubricating systems and particularly to a system which is especially adapted to lubricating internal combustion motors.

An object of the invention is to provide an improved lubricating system which will efficiently lubricate the cylinder walls of an internal combustion motor.

Another object is to provide an improved lubricating system in which the pressure upon and amount of lubricant supplied to the walls of a cylinder may be correlated to the throttle setting of the engine.

Another object is to provide an improved lubricating system in which the pressure upon and amount of lubricant supplied the cylinder walls will be controlled by the temperature of the engine.

Other objects will hereinafter appear.

The invention will be better understood from the description of one practical embodiment thereof illustrated in the accompanying drawing, in which.

Figure 1:
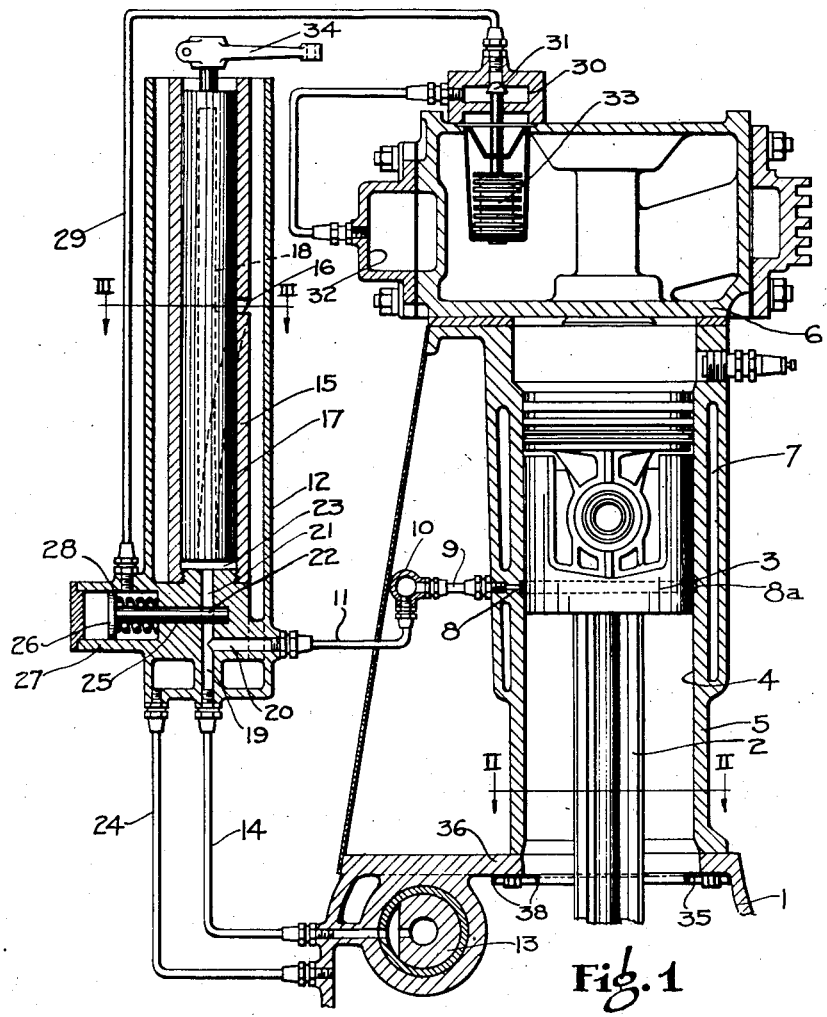
Figure 1 is a transverse sectional view of an internal combustion motor provided with lubricating apparatus embodying the invention.
Figure 3:
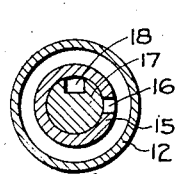
Figure 3 is a fragmentary sectional view taken on the line III—III of Figure 1.
Figure 2:
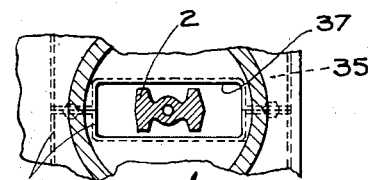
Figure 2 is a fragmentary sectional view taken on the line II—II of Figure 1.

The motor illustrated comprises a crank case 1 in which is journaled a crank (not shown) operated by connecting rods 2 pivoted at their upper ends in pistons 3. The pistons reciprocate in cylinders 4 formed within a cylinder block, the upper end of the block being closed by a cylinder head 6. The cylinder block is formed with a water jacket 7 surrounding the cylinders and extending throughout the head.

Through the side walls of each cylinder extends an oil inlet port 8 by which the lubricant may be supplied to the interior of the cylinder wall at a point which is always covered by some portion of the piston. A groove 8a distributes the oil about the piston. Threaded into the end of the inlet port is the end of a pipe 9 which communicates with a manifold 10 which, in turn, is connected to a lubricant reservoir by a pipe 11. The reservoir is shown in the form of an upright cylindrical shell 12 carried adjacent the cylinder block. Lubricant is supplied to the reservoir from the cam shaft or other rotating part of the engine 13 through a conduit 14. Within the shell is an upwardly extending tubular sleeve 15 provided with a helical slot 16 extending throughout most of its length and turning through about 120°. Within this cylinder is a shaft 17 having a straight slot 18 extending upwardly from its lower end nearly to its top and arranged to overlie a portion of the slot 16 in any operative position. The upper end of conduit 14 is connected to a bifurcated duct 19, one branch of which 20 communicates with the manifold and the other branch of which 21 communicates through a valve port 22 with a space 23 within cylinder 15 and below the end of shaft 17. An overflow duct 24 leads from the bottom of the interior of shell 12 back to the interior of the crank case.

From the above description it will be seen that as the cam shaft rotates, oil is pumped through conduit 14 and, if valve port 22 is open, rises within the slot 18 in shaft 17 to the point where this slot is in communication with the slot 16 through cylinder 15, at which point the oil overflows and runs down within the shell, passing through the duct 24 leading to the crank case. Thus a column of oil is maintained of a height determined by the relative position of cylinder 15 and shaft 17. The pressure on the lubricating oil in ducts 19 and 20 caused by the weight of this column forces an amount of oil more or less proportional to the height of column through pipes 11 and 9 to the inlets 8 in the various cylinder walls. If however, port 22 is closed the lubricant is delivered directly from the conduit 14 to the manifold 10 and thence to the inlets 8, the pressure at which it is delivered being materially greater than that produced by the column of fluid.

The port 22 is controlled by a valve consisting of a spindle 25 having a piston-like head 26 within a cylinder 27 and urged outwardly by a spring 28 carried by the exterior of the shell 12. A conduit 29 is connected with the portion of the cylinder in which the spring is located and this, in turn, is connected, through a chamber 30 in which a needle valve 31 is positioned, to the intake manifold 32 of the motor, so that the suction within this manifold may be used to reduce the pressure within the cylinder, causing the atmospheric pressure on head 26 to overcome the force of this spring and cause the valve 25 to close the port 22. The needle valve is directly connected to a thermostat consisting of a bellows 33 positioned within the water jacketing of the motor, illustrated as within the cylinder head, so that this valve is directly controlled by the temperature of the water in the cooling system.

The upper end of shaft 17 is provided with an arm 34 which is connected to a part of the throttle controlling mechanism so that this shaft is rotated as the throttle is varied and thereby maintains the height of the fluid column proportional to the throttle opening. Obviously if it were desired this shaft might be controlled by the speed of the engine or some other factor.

The function of the thermostatic control of valve 25 is to permit the motor when cold to receive a larger amount of lubricant under higher pressure than under operating conditions after it has been warmed up, the thermostat being so arranged that the needle valve 31 is opened when the circulating water is cold, allowing the suction in the intake manifold to close port 21 and allow the fluid to be delivered at its maximum pressure.

Within the crank case are positioned baffles 35 secured to the underside of the upper flange 31 of the crank case, these baffles each being provided with a slot 37 just large enough to permit the oscillation of the connecting rod and having down-turned peripheral flanges 38. The purpose of the baffles is to catch the lubricant splashed by the rotation of the crank shaft and to cause the same to drip back into the crank case without getting on the cylinder walls, as the lubricant supplied through inlets 8 is sufficient to lubricate these walls.

While I have described the illustrated embodiment of my invention in some particularity, obviously many others will readily occur to those skilled in this art, and I do not, therefore, limit myself to the precise details shown and described but claim as my invention all embodiments, variations, and modifications thereof coming within the scope of the appended claims.

I claim:

1. In an engine lubricating system, a supply of lubricant under pressure communicating with the cylinder walls of the engine, means controlling the pressure in accordance with the throttle opening, and means for rendering the said controlling means inoperative when the motor is cold.

2. In an engine lubricating system, means for supplying lubricant under pressure, a gravity column to which said lubricant is delivered, means controlled by the throttle controlling mechanism for controlling the height of said column, and a conduit leading from said column to the cylinders of the engine.

3. In an engine lubricating system, means for supplying lubricant under pressure, a conduit having two branches one of which leads to the cylinders of the engine, a valve in the other branch, the second branch communicating with a gravity column, means controlling the height of the column operated by the throttle controlling mechanism, and thermostatic means controlling the valve.

4. In an engine lubricating system, a source of lubricant under pressure, a conduit leading therefrom and having two branches, one of the branches leading to the cylinder walls of the engine, and the other to a column, an adjustable overflow for said column operated by the throttle mechanism of the engine, a valve in the second branch of said conduit, resilient means normally maintaining said valve open, air pressure operated means for closing said valve, a connection between said air pressure operated means and the intake manifold of the engine, and a valve in said connection operated by a thermostat.

5. In combination with an internal combustion motor, a source of fluid under pressure, a conduit leading from said source and divided into two branches, one of said branches communicating with the cylinder walls of the motor, the other of said branches passing through a valve to the interior of a cylindrical sleeve, the walls of the sleeve being provided with a helical groove extending therethrough, a shaft within the sleeve having a longitudinally extending groove arranged to overlie one point of said helical groove and thus determine the height of a column of fluid, a shell surrounding the sleeve to receive the fluid overflowing through the grooves, a duct leading from the bottom of the shell to the interior of the crank case of the motor, an operating lever carried by the upper end of the shaft and connected to the throttle controlling mechanism of the motor, a cylinder carried by the shell, a piston reciprocable therein and operating said valve, a spring urging the piston in one direction, a source of suction connected to the cylinder to urge the piston in the other direction, a valve controlling said suction, and a thermostat operating said valve and exposed to the cooling fluid of the motor.

6. In an engine lubricating system, means for delivering lubricant under pressure to the cylinder walls of the engine, and means connected to the throttle of the engine varying the pressure of the lubricant supplied in proportion to the throttle opening.

HAROLD D. CHURCH.